US009399199B2

(12) United States Patent
Dille et al.

(10) Patent No.: US 9,399,199 B2
(45) Date of Patent: Jul. 26, 2016

(54) TURNING VANE

(71) Applicant: ILLINOIS TOOL WORKS INC., Glenview, IL (US)

(72) Inventors: Joseph C. Dille, Telford, PA (US); Robert W. Altonji, Quakertown, PA (US); Guoging Wang, Lansdale, PA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/772,461

(22) PCT Filed: Feb. 9, 2014

(86) PCT No.: PCT/US2014/015461
§ 371 (c)(1),
(2) Date: Sep. 3, 2015

(87) PCT Pub. No.: WO2014/158375
PCT Pub. Date: Oct. 2, 2014

(65) Prior Publication Data
US 2016/0001239 A1 Jan. 7, 2016

Related U.S. Application Data

(60) Provisional application No. 61/777,212, filed on Mar. 12, 2013.

(51) Int. Cl.
| | | |
|---|---|---|
| *G01F 1/37* | (2006.01) | |
| *B01F 5/06* | (2006.01) | |
| *G01F 1/684* | (2006.01) | |
| *G01F 1/84* | (2006.01) | |
| *G01F 5/00* | (2006.01) | |
| *G05D 7/06* | (2006.01) | |
| *G01F 1/82* | (2006.01) | |
| *F15D 1/00* | (2006.01) | |

(52) U.S. Cl.
CPC ............. *B01F 5/0602* (2013.01); *G01F 1/684* (2013.01); *G01F 1/6842* (2013.01); *G01F 1/82* (2013.01); *G01F 1/84* (2013.01); *G01F 5/00* (2013.01); *G05D 7/0635* (2013.01); *F15D 1/001* (2013.01)

(58) Field of Classification Search
USPC ............ 73/202, 861.22, 861.52, 1.35; 702/47
See application file for complete search history.

(56) References Cited

U.S. PATENT DOCUMENTS

| | | | |
|---|---|---|---|
| 3,254,475 A | | 6/1966 | Farr et al. |
| 4,372,169 A | * | 2/1983 | Hughes ............... B05B 17/0692 73/861.22 |
| 4,461,173 A | * | 7/1984 | Olin ...................... G01F 1/6842 73/202.5 |

(Continued)

OTHER PUBLICATIONS

ISR and WO for PCT/US2014/15461 mailed May 28, 2014.

*Primary Examiner* — Jewel V Thompson

(57) ABSTRACT

The disclosed embodiments include a mass flow controller for controlling a flow of a fluid. In one embodiment, the mass flow controller comprises an inlet for receiving the fluid; a flow path in which the fluid passes through the mass flow controller; a mass flow meter for providing a signal corresponding to mass flow of the fluid through the flow path, the mass flow meter having a bypass through which a majority of fluid flows; a turning vane positioned upstream of the bypass for generating a more uniform fluid flow; an adjustable valve for regulating the flow of the fluid out of an outlet of the mass flow controller; and a controller configured to apply a valve control signal to adjust the adjustable valve to a desired valve position to control the flow of the fluid out of an outlet of the mass flow controller.

20 Claims, 12 Drawing Sheets

(56) References Cited

U.S. PATENT DOCUMENTS

| | | | | |
|---|---|---|---|---|
| 4,576,054 A * | 3/1986 | Lalin | ......................... | G05D 7/03 73/863.03 |
| 5,323,661 A * | 6/1994 | Cheng | ....................... | F15D 1/04 137/8 |
| 5,554,805 A * | 9/1996 | Bahrton | .................... | G01F 1/42 73/1.25 |
| 5,975,126 A * | 11/1999 | Bump | ................... | G01F 1/6842 137/486 |
| 6,845,659 B2 | 1/2005 | Lull | | |
| 7,032,383 B2 * | 4/2006 | Weber | .................... | F02B 33/40 138/37 |
| 7,464,611 B2 * | 12/2008 | Matter | .................. | G01F 1/6842 73/202 |
| 8,205,635 B2 * | 6/2012 | Igarashi | .................... | G01F 1/42 137/486 |
| 8,746,032 B1 * | 6/2014 | Feller | ................. | G01F 25/0007 73/1.35 |
| 2007/0089788 A1 * | 4/2007 | Chinnock | ............... | G01F 1/363 137/487.5 |
| 2008/0059084 A1 * | 3/2008 | Wang | ...................... | G01F 1/363 702/47 |
| 2008/0283014 A1 | 11/2008 | Konzelmann et al. | | |
| 2011/0191038 A1 | 8/2011 | Lull | | |
| 2011/0241334 A1 | 10/2011 | Kawano | | |
| 2014/0053634 A1 * | 2/2014 | Woolard | ............. | G01N 15/082 73/38 |

* cited by examiner

TURNING VANE

RELATED APPLICATIONS

The present application is a National Phase of International Application Number PCT/US2014/015461 filed Feb. 9, 2014 and claims priority to U.S. Provisional Application No. 61/777,212 filed Mar. 12, 2013.

BACKGROUND OF THE INVENTION

1. Field of the Invention

The present invention relates generally to the operation of a mass flow controller (MFC) or a mass flow meter (MFM).

2. Discussion of the Related Art

Many industrial processes require precise control of various process fluids. For example, in the semiconductor industries, mass flow controllers are used to precisely measure and control the amount of a process fluid that is introduced to a process chamber. The term fluid is used herein to describe any type of matter in any state that is capable of flow. For example, it is to be understood that the term fluid may apply to liquids, gases, vapors, and slurries comprising any combination of matter or substance to which controlled flow may be of interest.

The maximum flow rate measured by a typical thermal mass flow sensor as utilized in a mass flow controller or a mass flow meter is typically limited to approximately 10 sccm depending on the sensor design. Consequently, all MFCs and MFMs utilize a flow bypass so the device can obtain higher flow rates. The perfect bypass would maintain a constant ratio. In other words, total flow for a MFC with a 10:1 flow bypass ratio would be 11 sccm when the sensor is reading 1 sccm and 110 sccm when the sensor is reading 10 sccm. Unfortunately, bypass ratio is affected by the bypass design, fluid properties and the flow path upstream and downstream of the sensor/bypass assembly. So the bypass ratio will change as the flow rate is increased. The change in flow ratio is commonly referred to as "bypass non-linearity." Such non-linearity degrades the instrument range or turndown and therefore the instrument accuracy. High flow bypass designs typically exhibit extremely poor linearity.

Accordingly, the disclosed embodiments seek to provide one or more solutions to the above problems. In particular, the inventors determined that most of the non-linearity is due to entrance affects at the bypass inlet. Thus, the inventors recognized that any improvement in bypass linearity is valuable because it will improve accuracy on process gas and improve the range of the instrument.

BRIEF DESCRIPTION OF THE DRAWINGS

Illustrative embodiments of the present invention are described in detail below with reference to the attached figures, which are incorporated by reference herein and wherein.

DETAILED DESCRIPTION

The disclosed embodiments and advantages thereof are best understood by referring to FIGS. 1-10 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

Figure 1:
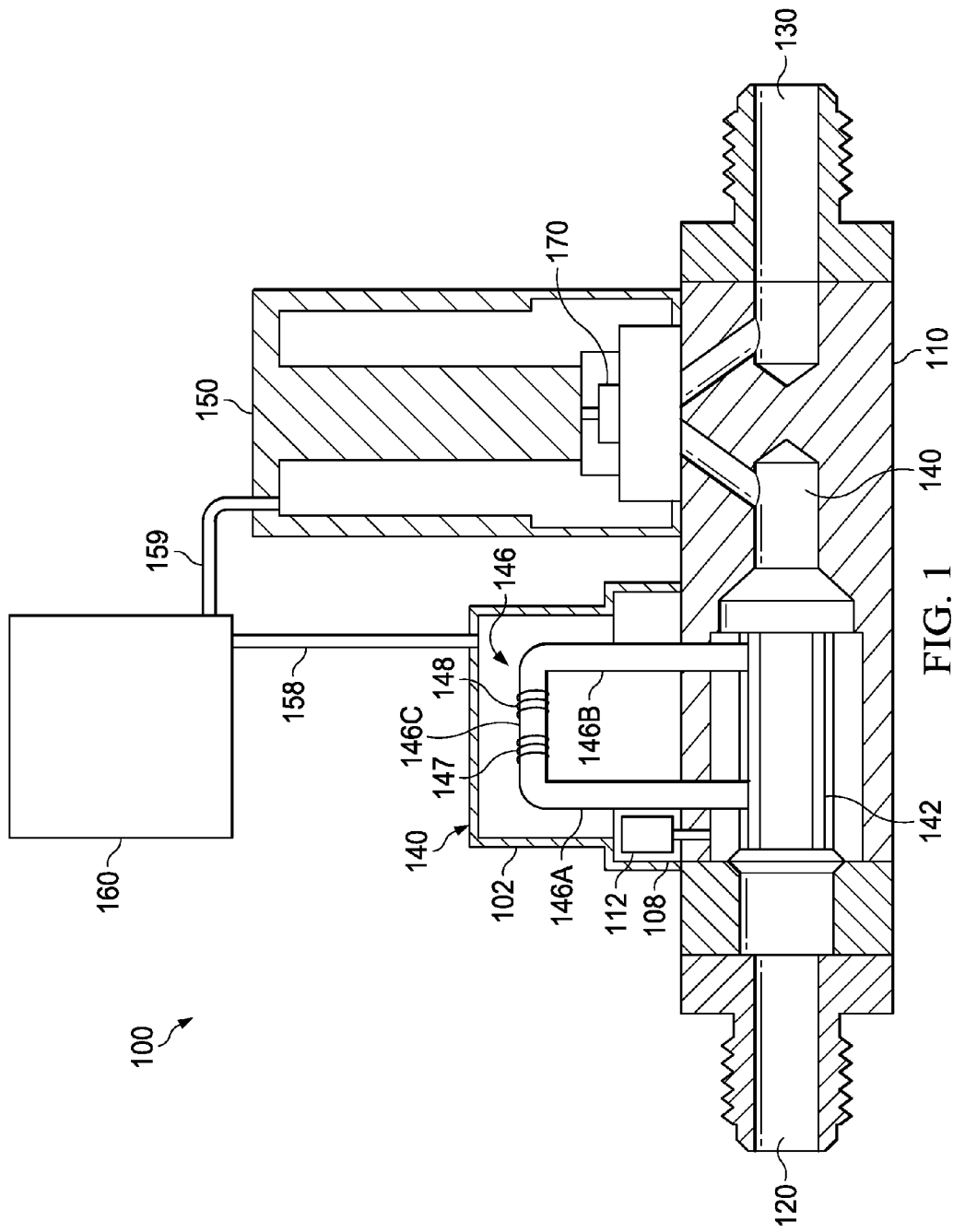
FIG. 1 is a diagram that illustrates components of a mass flow controller in accordance with the disclosed embodiments.

FIG. 1 illustrates components of a mass flow controller 100 in accordance with the disclosed embodiments. Mass flow controller 100 includes a step 110, which is the platform on which the components of the mass flow controller are mounted. A thermal mass flow meter 140 and a valve assembly 150 are mounted on the step 110 between a fluid inlet 120 and a fluid outlet 130. The valve assembly 150 includes a control valve 170. The thermal mass flow meter 140 includes a bypass 142 through which typically a majority of fluid flows and a thermal flow sensor 146 through which a smaller portion of the fluid flows.

Thermal flow sensor 146 is contained within a sensor housing 102 (portion shown removed to show sensor 146) mounted on a mounting plate or base 108. Sensor 146 is a small diameter tube, typically referred to as a capillary tube, with a sensor inlet portion 146A, a sensor outlet portion 146B, and a sensor measuring portion 146C about which two resistive coils or windings 147, 148 are disposed. In operation, electrical current is provided to the two resistive windings 147, 148, which are in thermal contact with the sensor measuring portion 146C. The current in the resistive windings 147, 148 heats the fluid flowing in measuring portion 146 to a temperature above that of the fluid flowing through the bypass 142. The resistance of windings 147, 148 varies with temperature. As fluid flows through the sensor conduit, heat is carried from the upstream resistor 147 toward the downstream resistor 148, with the temperature difference being proportional to the mass flow rate through the sensor.

An electrical signal related to the fluid flow through the sensor is derived from the two resistive windings 147,148. The electrical signal may be derived in a number of different ways, such as from the difference in the resistance of the resistive windings or from a difference in the amount of energy provided to each resistive winding to maintain each winding at a particular temperature. Examples of various ways in which an electrical signal correlating to the flow rate of a fluid in a thermal mass flow meter may be determined are described, for example, in commonly owned U.S. Pat. No. 6,845,659, which is hereby incorporated by reference. The electrical signals derived from the resistive windings 147,148 after signal processing comprise a sensor output signal.

The sensor output signal is correlated to mass flow in the mass flow meter so that the fluid flow can be determined when the electrical signal is measured. The sensor output signal is typically first correlated to the flow in sensor 146, which is then correlated to the mass flow in the bypass 142, so that the total flow through the flow meter can be determined and the control valve 170 can be controlled accordingly. The correlation between the sensor output signal and the fluid flow is complex and depends on a number of operating conditions including fluid species, flow rate, inlet and/or outlet pressure, temperature, etc.

A bypass 142 may then be mounted to the sensor, and the bypass 142 is tuned with the known fluid to determine an appropriate relationship between fluid flowing in the mass flow sensor and the fluid flowing in the bypass at various known flow rates, so that the total flow through the flow meter can be determined from the sensor output signal. In some mass flow controllers, no bypass is used, and the entire flow passes through the sensor. The mass flow sensor portion and bypass 142 may then be mated to the control valve and control electronics portions and then tuned again, under known conditions. The responses of the control electronics and the control valve are then characterized so that the overall response of the system to a change in set point or input pressure is known, and the response can be used to control the system to provide the desired response.

In addition, the mass flow controller 100 may include a pressure transducer 112 coupled to flow path at some point, typically, but not limited to, upstream of the bypass 142 to measure pressure in the flow path. Pressure transducer 112 provides a pressure signal indicative of the pressure.

Control electronics 160 control the position of the control valve 170 in accordance with a set point indicating the desired mass flow rate, and an electrical flow signal from the mass flow sensor indicative of the actual mass flow rate of the fluid flowing in the sensor conduit. Traditional feedback control methods such as proportional control, integral control, proportional-integral (PI) control, derivative control, proportional-derivative (PD) control, integral-derivative (ID) control, and proportional-integral-derivative (PID) control are then used to control the flow of fluid in the mass flow controller. A control signal (e.g., a control valve drive signal) is generated based upon an error signal that is the difference between a set point signal indicative of the desired mass flow rate of the fluid and a feedback signal that is related to the actual mass flow rate sensed by the mass flow sensor. The control valve is positioned in the main fluid flow path (typically downstream of the bypass and mass flow sensor) and can be controlled (e.g., opened or closed) to vary the mass flow rate of fluid flowing through the main fluid flow path, the control being provided by the mass flow controller.

In the illustrated example, the flow rate is supplied by electrical conductors 158 to a closed loop system controller 160 as a voltage signal. The signal is amplified, processed and supplied using electrical conductors 159 to the valve assembly 150 to modify the flow. To this end, the controller 160 compares the signal from the mass flow sensor 140 to predetermined values and adjusts the control valve 170 accordingly to achieve the desired flow.

Although FIG. 1 depicts that the mass flow controller 100 includes a thermal mass flow sensor, the mass flow controller 100, in accordance with the disclosed embodiments, may utilize other types of mass flow sensors including a Coriolis type sensor. An advantage of using a Coriolis-based sensor is that it is capable of determining mass flow independent of temperature, flow profile, density, viscosity, and homogeneity.

Additionally, the disclosed embodiments may also be utilized in a mass flow meter. A mass flow meter differs from a mass flow controller, as described above, in that it lacks the control functions. Instead, the mass flow meter is used merely to measure or determine fluid flow rate.

As stated above, the disclosed embodiments seek to improve bypass linearity because doing so will improve accuracy on process gas and improve the range of the instrument. For the purpose of this disclosure the term "turndown" is used as a measurement of the linearity of the bypass design. It is defined as the total flow at 100% sensor output divided by the total flow at 2% sensor output. Therefore, a perfectly linear bypass design would have a turndown of 50. Acceptable instruments can be made with turndowns less than the ideal 50, but the lower the turndown, the lower the accuracy potential of the instrument.

Figure 1A:
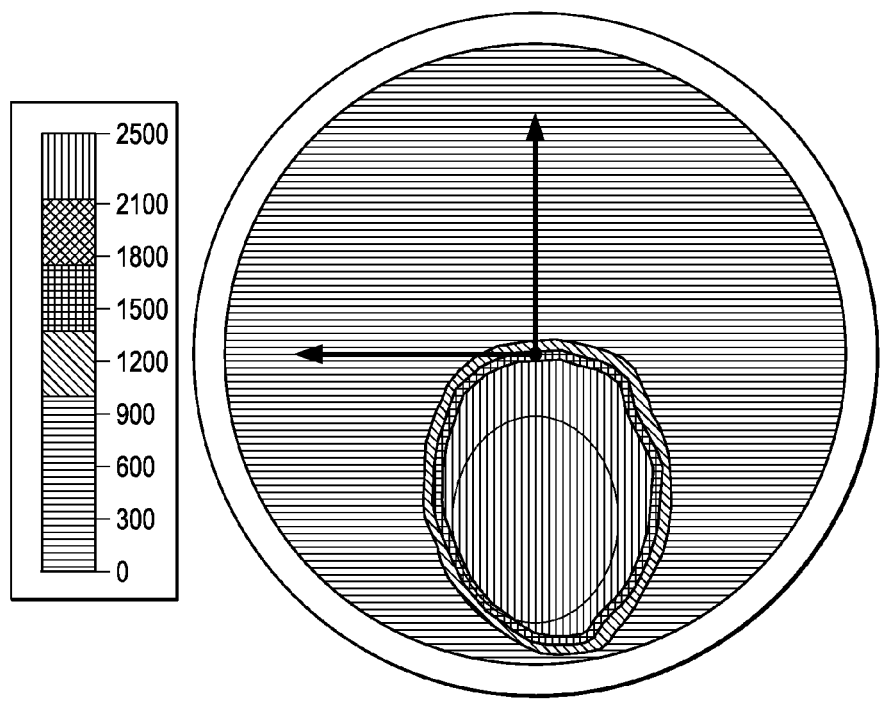
FIG. 1A is a diagram that depicts the speed contour of a flow meter device without an inlet mesh in accordance with the disclosed embodiments.
Figure 1B:
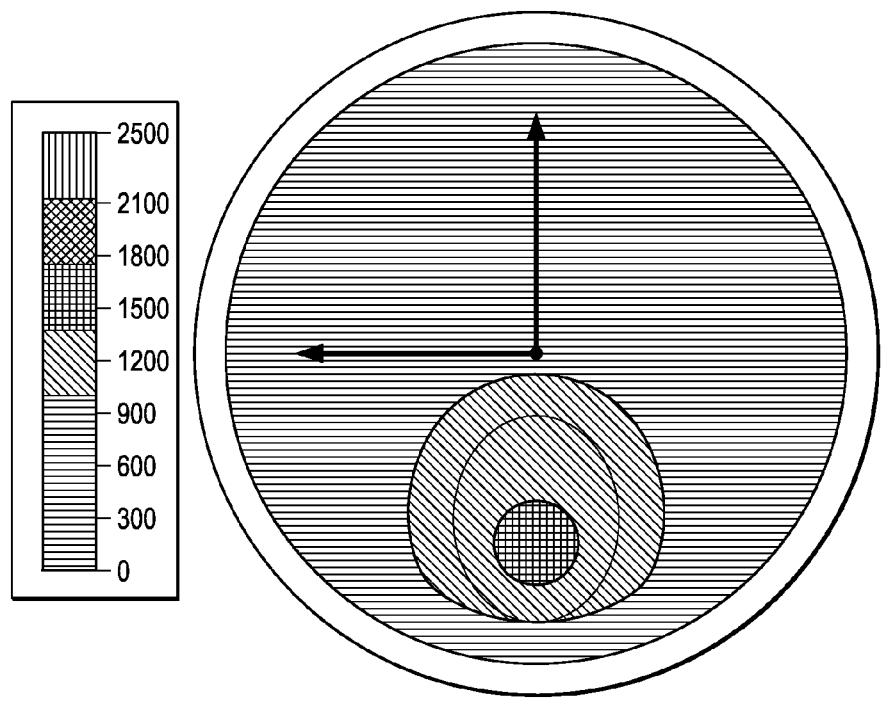
FIG. 1B is a diagram that depicts the speed contour of a flow meter device with an inlet mesh in accordance with the disclosed embodiments.

Currently, inlet screens (also referred to as a "mesh") are typically used to "flatten" out the velocity profile at the entrance to the bypass 142. FIGS. 1A and 1B respectively depict the speed contour of a flow meter device without an inlet mesh and a flow meter device with an inlet mesh. However, even with an inlet mesh, the disclosed embodiments provide a dramatic improvement over the current use of inlet screens by adding a turning vane. For example, with reference now to FIG. 2, in one embodiment, a turning vane 200 with a flow mixer 206 installed upstream of an inlet screen (not depicted) is used to generate a more uniform flow so that the turndown value can reach the max value for a given bypass design and given mesh.

Figure 2:
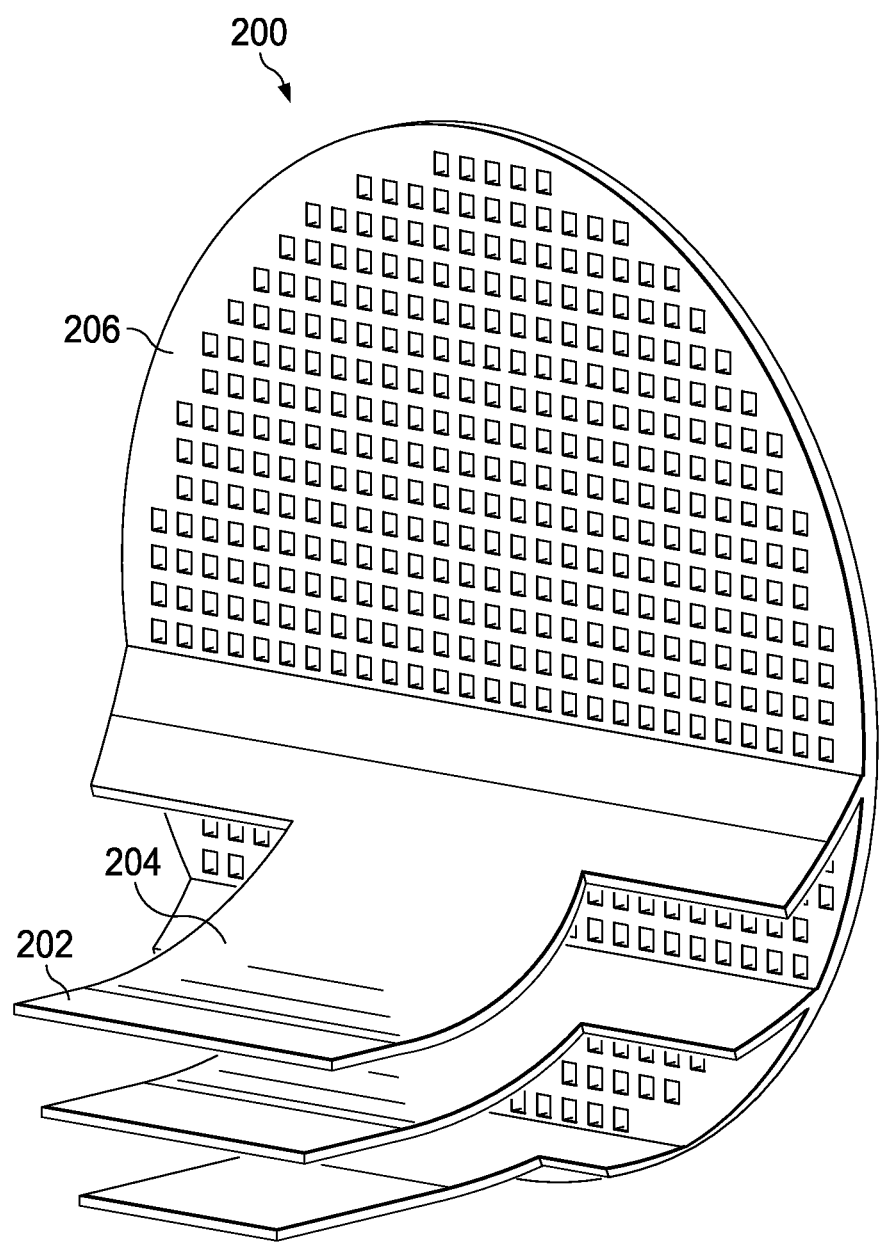
FIG. 2 is a diagram that illustrates a turning vane with a flow mixer in accordance with the disclosed embodiments.
Figure 3:
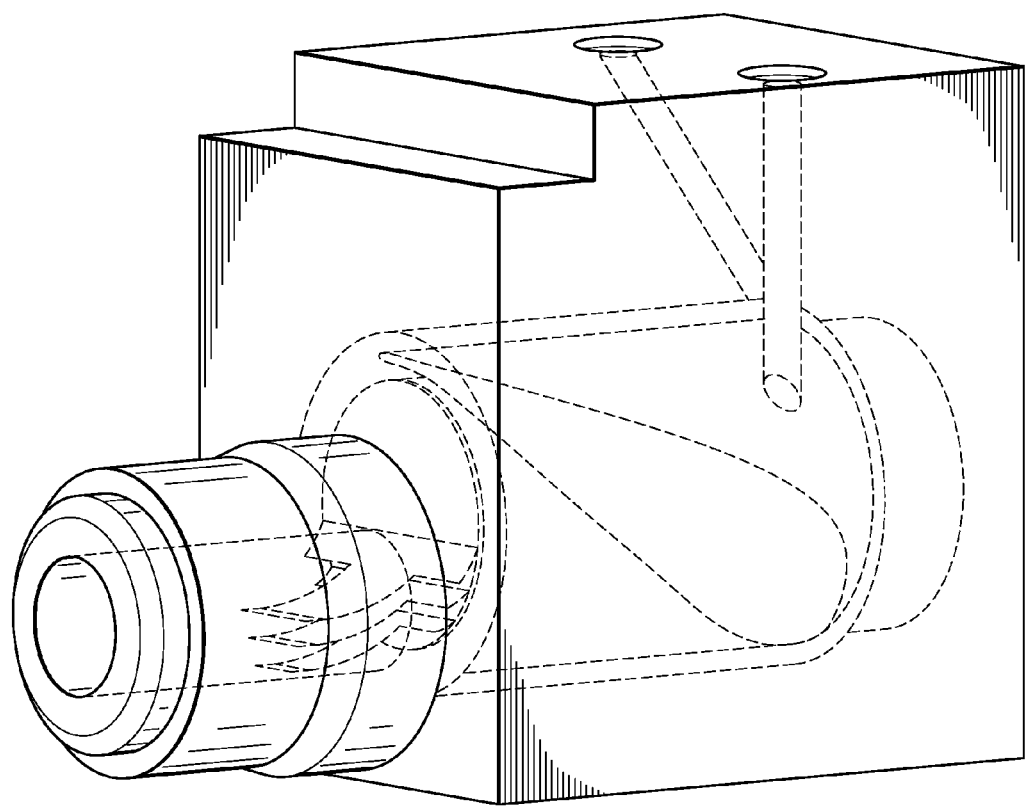
FIG. 3 is a diagram that illustrates the turning vane of FIG. 2 in an assembly in accordance with the disclosed embodiments.

FIG. 3 illustrates the turning vane of FIG. 2 in an assembly. One advantage of this turning vane design is that it can increase the turndown value by about 15% or more depending upon a given bypass design. The turning vane with a flow mixer more uniformly redistributes the fluid mass, so that more of the bypass mesh is used during maximum flow conditions. In the end, the turndown value reaches the max value for a given bypass design and a given mesh.

As depicted in FIG. 2, the turning vane 200 includes one or more vanes and a flow mixer 206. In one embodiment, the vanes and flow mixer are made of metal. In one embodiment, a vane consists of a flat section 202 upstream and a curved surface 204 downstream. The vanes form diffusers that distribute the flow across the available inlet area. The number, size, and shape of the vanes may vary within different embodiments. For example, in one embodiment, the angle of the curved surface 204 within a plurality of vanes of a turning vane will gradually increase from a bottom vane to a top vane as depicted in FIG. 2.

In one embodiment, the flow mixer 206 is a piece of coarse metal mesh, which can be part of the turning vane 200 or a separate element. The location of the turning vane 200 and the flow mixer 206 may be adjusted to reach the highest performance. The shape of the openings on the mixer can be an angular shape, such as star, circle, rectangle or a round shape such as a circle, oval, or ellipse. The dimensions can vary for the specific purposes.

FIGS. 4-7 depict an example of a simulated performance test of the turning vane 200 depicted in FIG. 2. In the depicted figures, a uniform flow of nitrogen is specified at the inlet (e.g., 6 LPM, 60 LPM, 120 LPM, etc.) of the flow meter at 25° C. The pressure drop is generated at the inlet and outlet of the sensor tube. During the simulations, the flow inside the sensor tube is not simulated because the flow through the sensor is at the order of magnitude of 0.005% of the total flow rate and has a negligible effect on the overall flow. The average pressure is measured at the locations of the inlet and outlet of the sensor tube. The verification has been conducted by comparing the numerical solutions with the experimental results so that the pressure drops in the simulations are in a good range of accuracy.

Figure 4A:
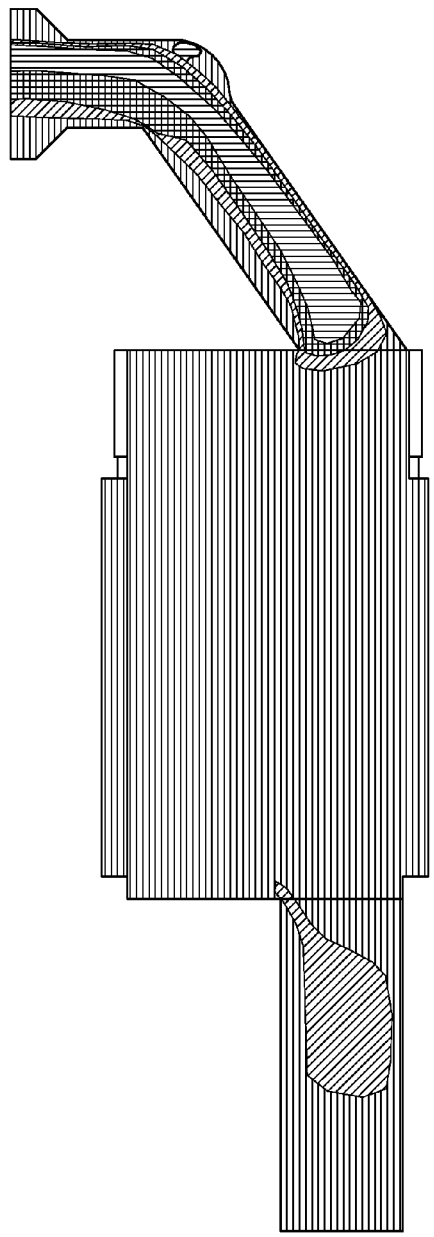
FIG. 4A is a diagram that depicts the speed contour of a flow meter device that does not have a turning vane and mixer in accordance with the disclosed embodiments.
Figure 4A:
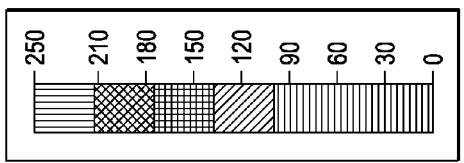
Figure 4B:
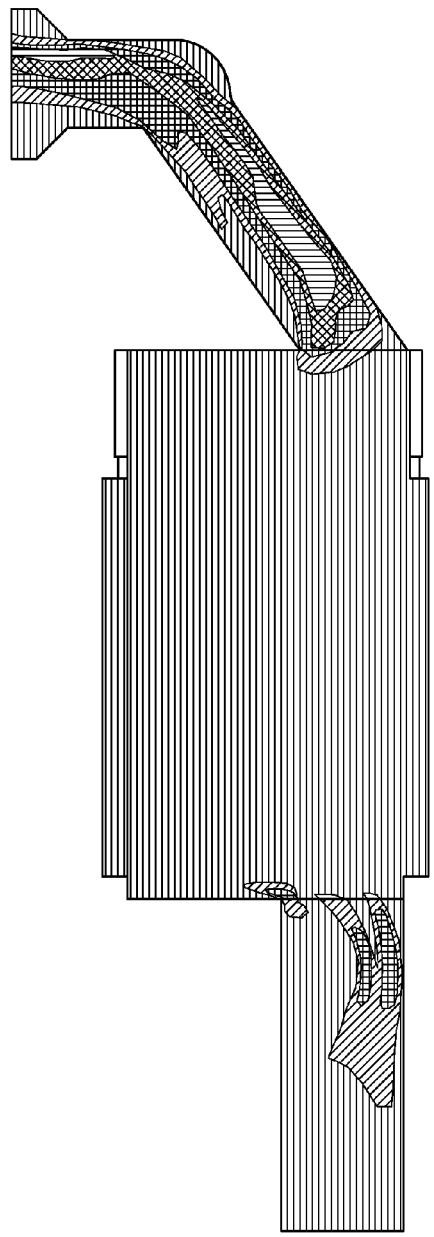
FIG. 4B is a diagram that depicts the speed contour of a flow meter device that includes a turning vane and mixer in accordance with the disclosed embodiments.
Figure 4B:
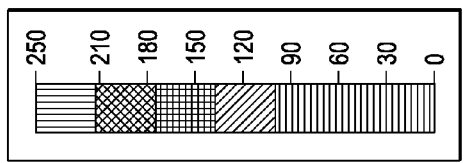

FIGS. 4A and 4B depict the difference in speed contour between a flow meter device that does not have the turning vane and mixer (FIG. 4A), and a flow meter device that includes the turning vane and mixer (FIG. 4B).

Figure 5A:
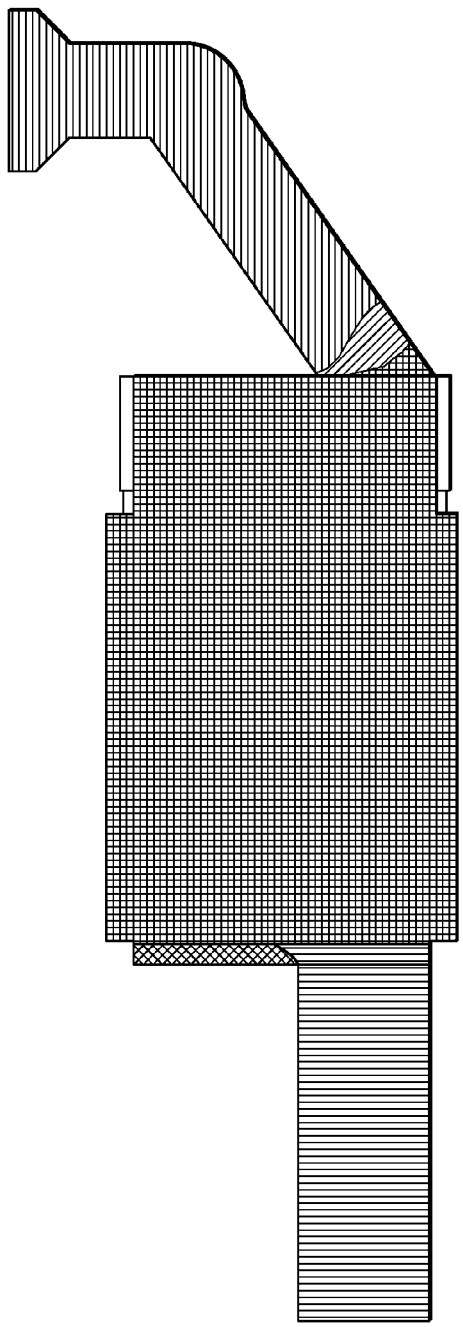
FIG. 5A is a diagram that depicts the pressure contour of a flow meter device that does not have a turning vane and mixer in accordance with the disclosed embodiments.
Figure 5A:
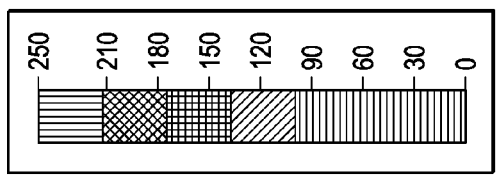
Figure 5B:
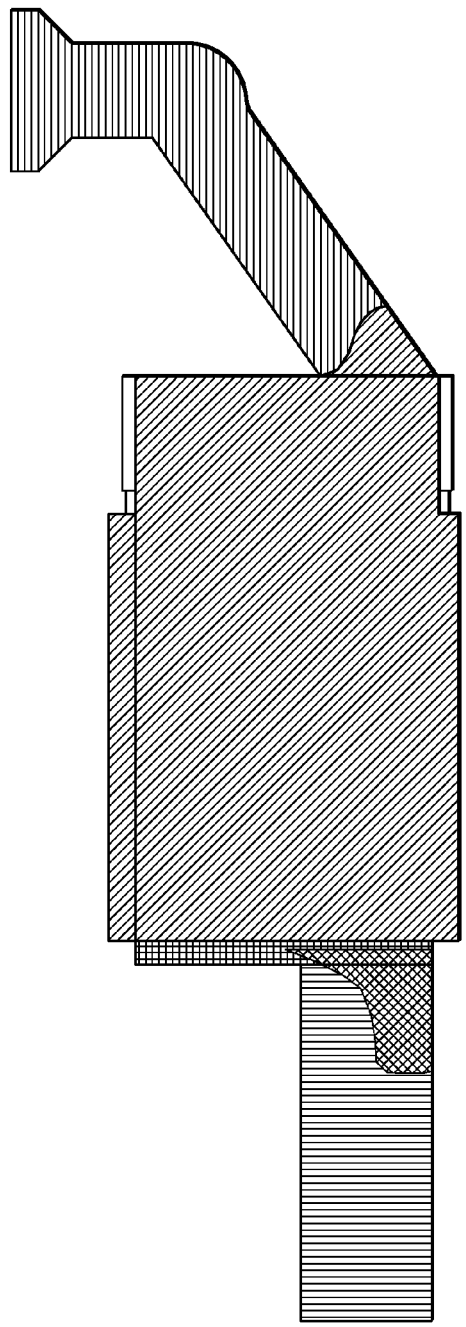
FIG. 5B is a diagram that depicts the pressure contour of a flow meter device that includes a turning vane and mixer in accordance with the disclosed embodiments.
Figure 5B:
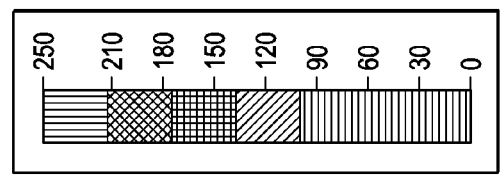

FIGS. 5A and 5B depict the difference in pressure contour between a flow meter device that does not have the turning vane and mixer (FIG. 5A), and a flow meter device that includes the turning vane and mixer (FIG. 5b).

Table 1, presented below, is a chart that indicates the difference in flow rate at 2 sccm and at 10 sccm, and the difference in turndown for a flow meter device that does not have the turning vane and mixer, and a flow meter device that includes the turning vane and mixer.

TABLE 1

| Device Type | Flow rate @ 0.2 sccm | Flow rate @ 10 sccm | Turndown |
|---|---|---|---|
| Regular flow meter with bypass mesh | 13.25 | 274.01 | 20.68 |
| Regular flow meter with bypass mesh plus turning vane and mixer | 15.13 | 358.28 | 23.68 |

Figure 6:
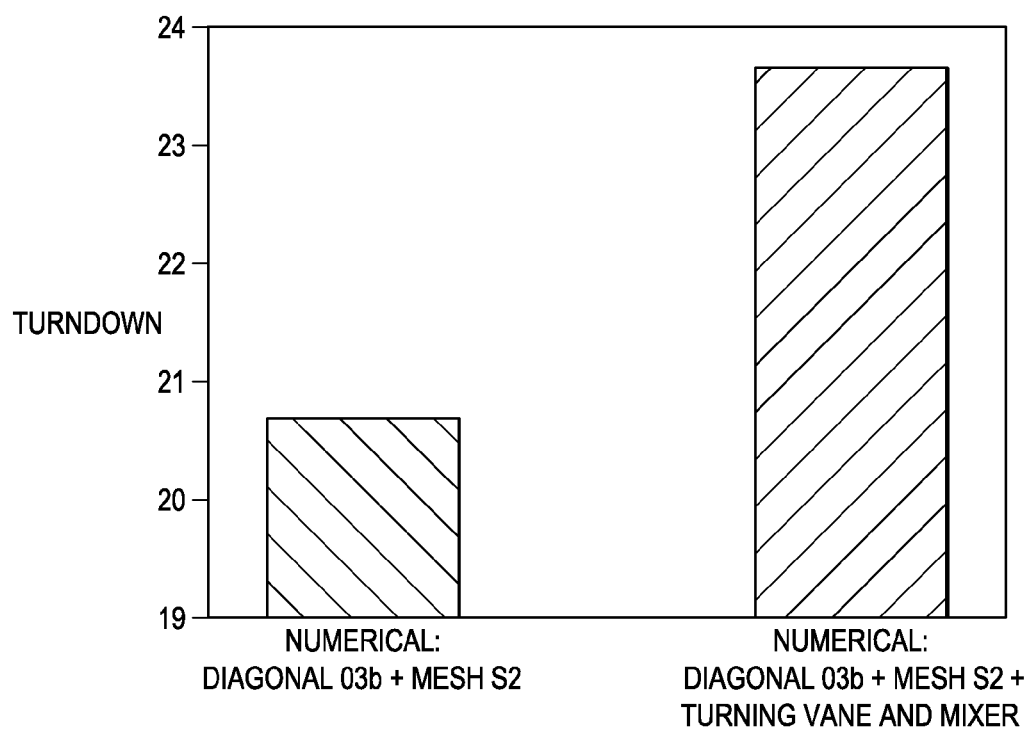
FIG. 6 is a graph depicting the difference in turndown between a flow meter device with a bypass mesh versus a flow meter with a bypass mesh plus a turning vane and mixer in accordance with the disclosed embodiments.

FIG. 6 is a graph depicting the difference in turndown between the two devices represented in Table 1.

Figure 7:
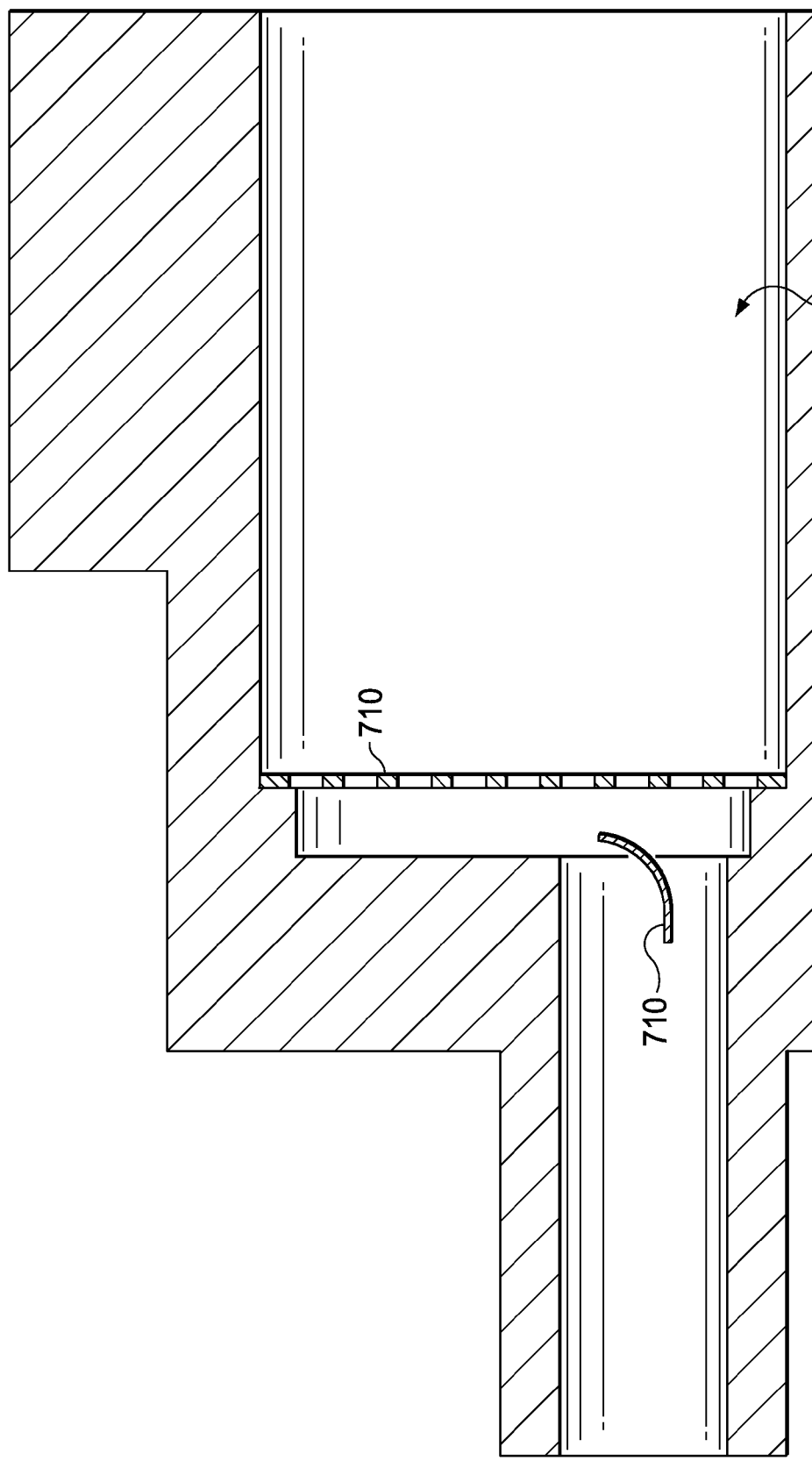
FIG. 7 is a diagram that illustrates an example of a turning vane in accordance with the disclosed embodiments.

FIG. 7 illustrates another embodiment of a turning vane 700 consisting of a single vane. In the depicted embodiment, the turning vane 700 is employed upstream of an existing inlet screen/mesh 710 that is located at the entrance of the bypass 720. Although not depicted, in certain embodiments, the turning vane 700 may also include a flow mixer, as either an integrated or separate component, of the turning vane 700. Additionally, the angle, size (e.g., width and height), and number of vanes for the turning vane 700 may vary in different embodiments.

Figure 8:
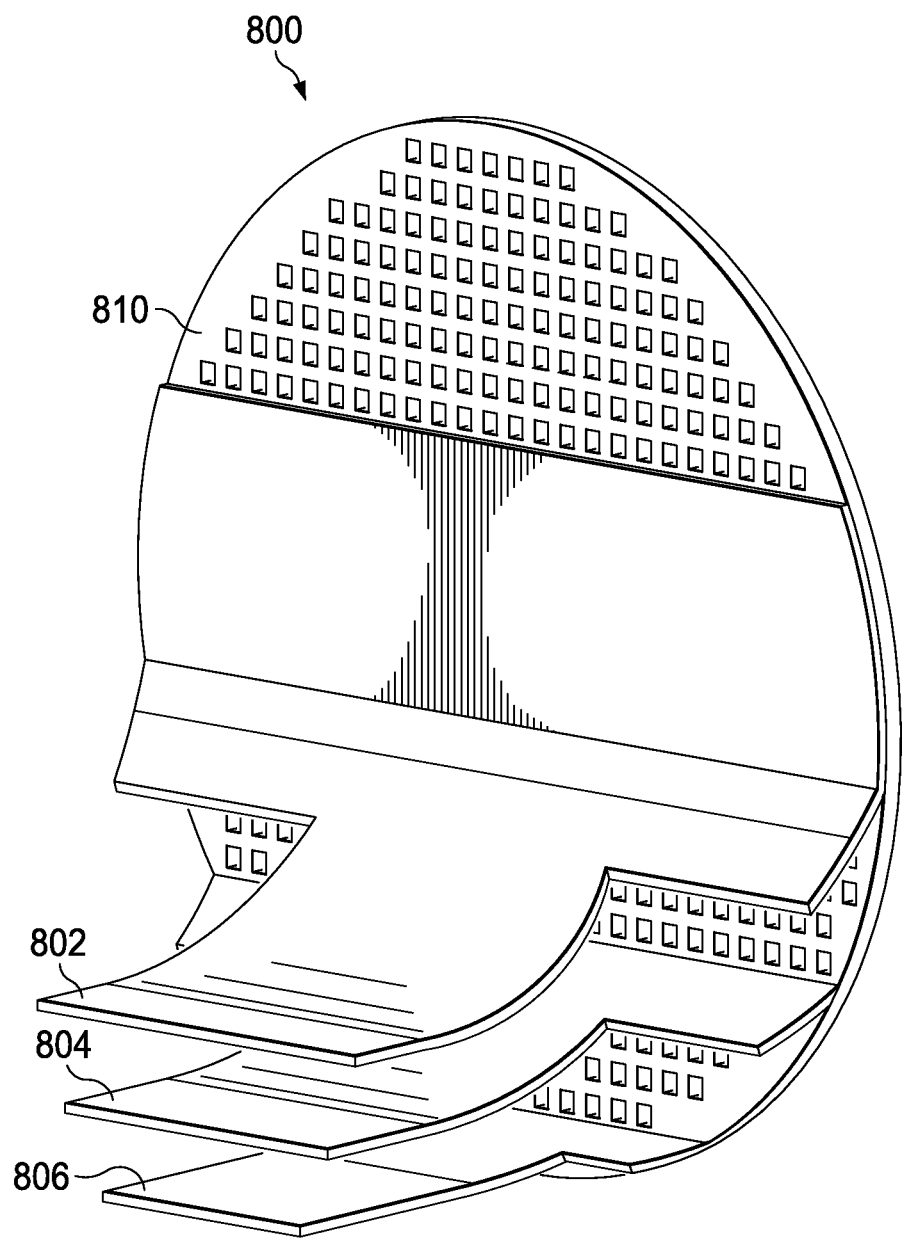
FIG. 8 is a diagram that illustrates another example of a turning vane in accordance with the disclosed embodiments.

For instance, FIG. 8 illustrates another example of a turning vane 800 with a flow mixer 810 in accordance with the disclosed embodiments. In this embodiment, the turning vane 800 consists of three vanes 802, 804, and 806. In certain embodiments, the dimensions (e.g., length, width, height, thickness, etc.) of the three vanes 802, 804, and 806 may vary from one another or may vary between different designs. Each of the vanes may 802, 804, and 806 may comprise of one or more metal sections coupled together or alternatively, may comprise of a single metal piece. Additionally, as depicted, in some embodiments, the uppermost vane 802 may include a large flat section abutting the flow mixer (as compared to the embodiment depicted in FIG. 2) that may further help distribute the flow across the available inlet area.

Figure 9A:
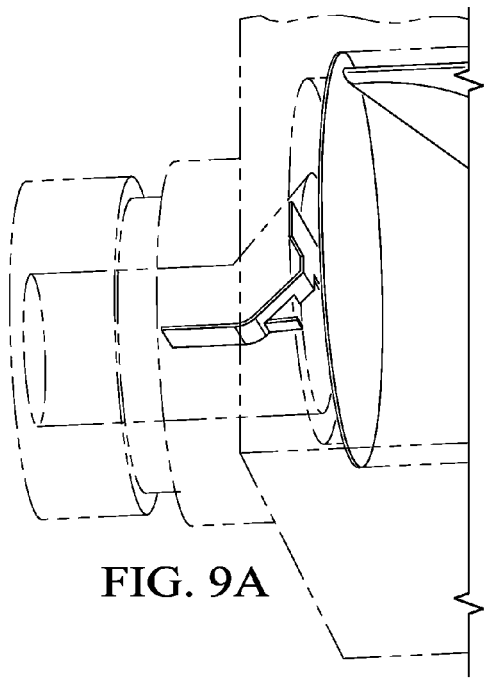
FIGS. 9A-9E are diagrams that illustrate various configurations of a turning vane in an assembly in accordance with the disclosed embodiments.
Figure 9B:
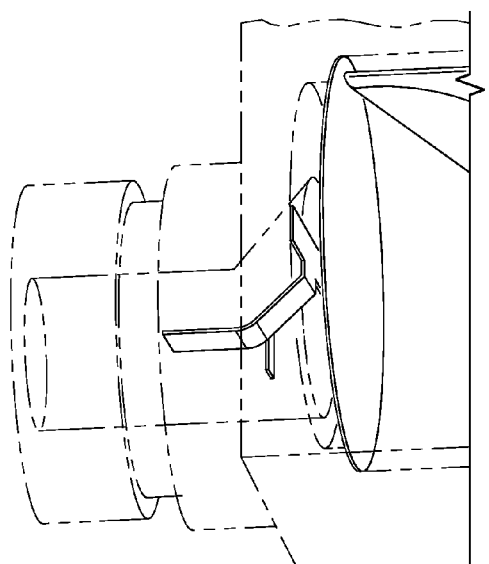
Figure 9C:
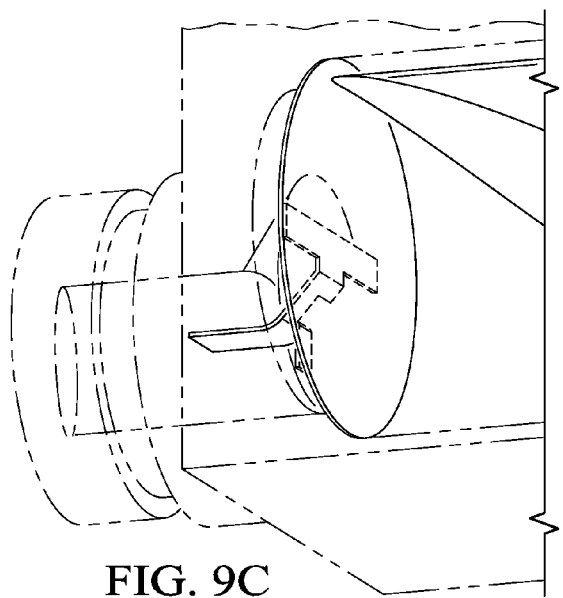
Figure 9D:
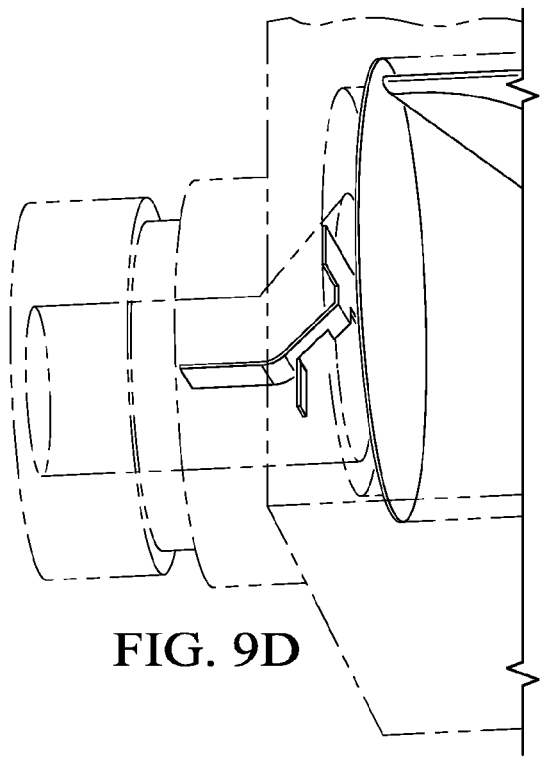
Figure 9E:
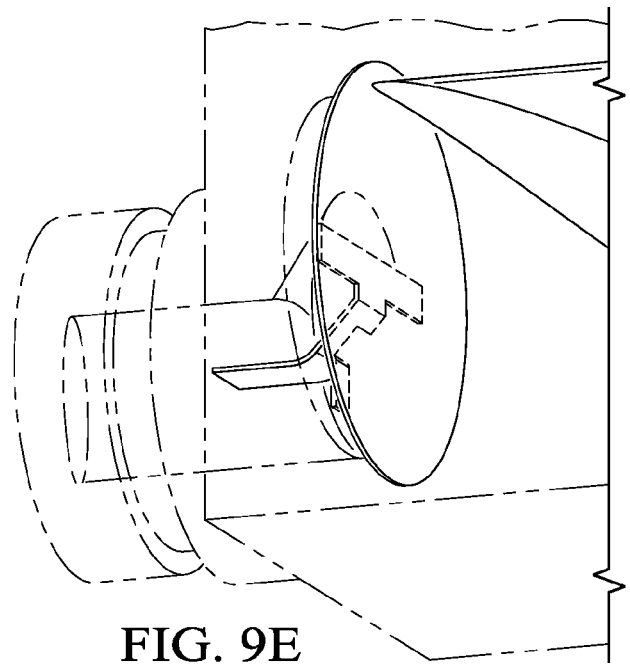

FIGS. 9A-9E illustrate various configurations of a turning vane in an assembly in accordance with the disclosed embodiments. For example, FIGS. 9A and 9B illustrate different support structures that may be employed with a turning vane in accordance with the disclosed embodiments. For instance, FIG. 9A illustrates that in one embodiment, a portion of the curved section of a turning vane may be straightened to allow for partial flow through the turning vane and provide additional support for the turning vane. FIG. 9B employs a different design that uses a single vertical support leg for providing additional support for the turning vane. FIG. 9C depicts a similar embodiment to that of 9B except that the turning vane abuts the inlet screen in the assembly. FIG. 9D depicts an embodiment in which a vertical support leg can be cut from a portion of the curved section similar to that of FIG. 9A. FIG. 9E illustrates a similar embodiment to that of Figure D, but without the flat portion of the vane abutting the inlet screen. Although not depicted, each of the depicted embodiments may employ the use of a flow mixer as described above.

Figure 10A:
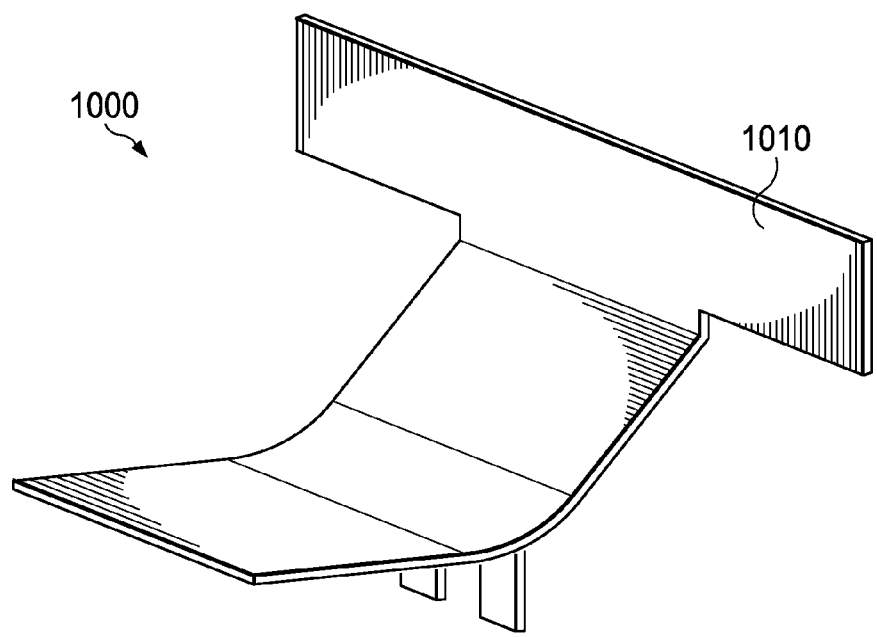
FIGS. 10A and 10B illustrate yet another example of a turning vane in an assembly in accordance with the disclosed embodiments.
Figure 10B:
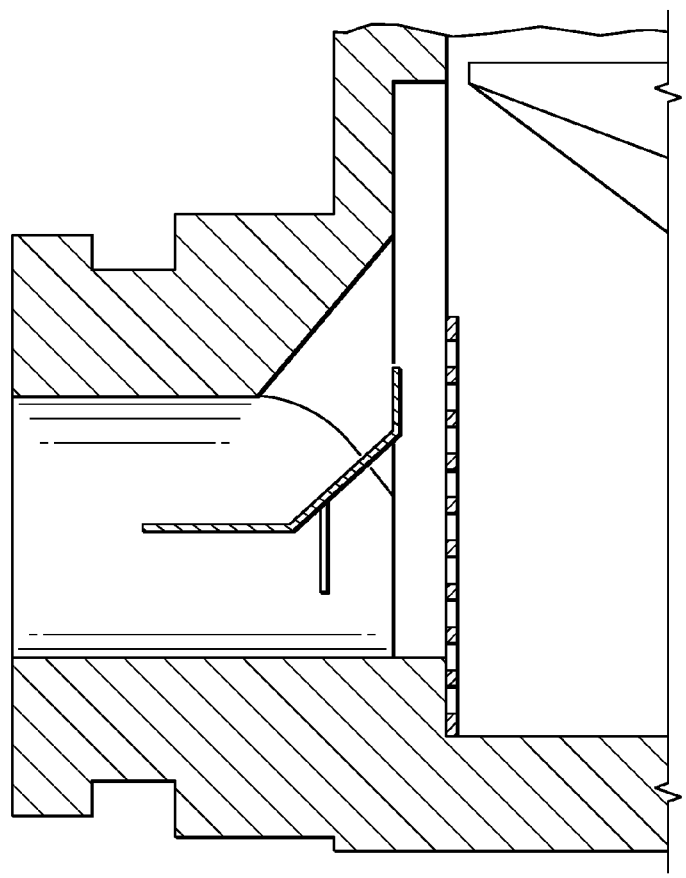

FIGS. 10A and 10B illustrate another embodiment of a turning vane 1000 in an assembly in accordance with the disclosed embodiments. In the depicted embodiment, the turning vane 1000 includes a pair of support legs 1010 for providing a support structure when installed in an assembly as shown in FIG. 10B.

While specific details about the above embodiments have been described, the above descriptions are intended merely as example embodiments and are not intended to limit the structure or implementation of the disclosed embodiments.

Accordingly, the disclosed inventions provide various embodiments of a turning vane that improves bypass linearity in a mass flow controller or mass flow meter, and thereby improving accuracy on process gas and the range of the instrument.

Those skilled in the art will recognize that the present teachings are amenable to a variety of modifications and/or enhancements. While the foregoing has described what is considered to be the best mode and/or other examples, it is understood that various modifications may be made therein and that the subject matter disclosed herein may be implemented in various forms and examples, and that the teachings may be applied in numerous applications, only some of which have been described herein. Such modifications are intended to be covered within the true scope of the present teachings.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, elements, and/or components, but do not preclude the presence or addition of one or more other features, elements, components, and/or groups thereof. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated. The scope of the claims is intended to broadly cover the disclosed embodiments and any such modification.

The invention claimed is:

1. A mass flow controller for controlling a flow of a fluid, the mass flow controller comprising:
    an inlet for receiving the fluid;
    a flow path in which the fluid passes through the mass flow controller;
    a mass flow sensor for providing a signal corresponding to mass flow of the fluid through the flow path;
    a bypass coupled to the mass flow sensor through which a majority of fluid flows;
    a turning vane positioned upstream of the bypass for generating a more uniform fluid flow;
    an adjustable valve for regulating the flow of the fluid out of an outlet of the mass flow controller; and
    a controller configured to apply a valve control signal to adjust the adjustable valve to a desired valve position to control the flow of the fluid out of an outlet of the mass flow controller.

2. The mass flow controller of claim 1, wherein the turning vane includes a flow mixer.

3. The mass flow controller of claim 2, wherein the flow mixer abuts an inlet screen of the bypass.

4. The mass flow controller of claim 2, wherein turning vane includes a flat portion abutting the flow mixer.

5. The mass flow controller of claim 1, wherein the turning vane comprises a plurality of vanes.

6. The mass flow controller of claim 5, wherein an angle of a curved surface for each vane within the plurality of vanes of the turning vane gradually increases from a bottom vane to a top vane.

7. The mass flow controller of claim 1, wherein the turning vane comprises a single vane.

8. The mass flow controller of claim 7, wherein a portion of a curved section of the single vane is straightened to permit partial fluid flow through the turning vane.

9. The mass flow controller of claim 1, wherein the turning vane includes a support structure.

10. The mass flow controller of claim 1, wherein the turning vane abuts an inlet screen of the bypass.

11. A turning vane configured to be positioned upstream of a bypass of at least one of a flow controller and flow meter for generating a more uniform fluid flow.

12. The turning vane of claim 11, further comprising a flow mixer.

13. The turning vane of claim 12, wherein the flow mixer is configured to abut an inlet screen of the bypass.

14. The turning vane of claim 12, wherein turning vane includes a flat portion abutting the flow mixer.

15. The turning vane of claim 11, wherein the turning vane comprises a plurality of vanes.

16. The turning vane of claim 15, wherein an angle of a curved surface for each vane within the plurality of vanes of the turning vane gradually increases from a bottom vane to a top vane.

17. The turning vane of claim 11, wherein the turning vane comprises a single vane.

18. The turning vane of claim 17, wherein a portion of a curved section of the single vane is straightened to permit partial fluid flow through the turning vane.

19. The turning vane of claim 1, wherein the turning vane includes a support structure.

20. A mass flow meter for measuring a flow of a fluid, the mass flow meter comprising:
    an inlet for receiving the fluid;
    a mass flow sensor for providing a signal corresponding to mass flow of the fluid through the mass flow meter;
    a bypass coupled to the mass flow sensor through which a majority of fluid flows; and
    a turning vane positioned upstream of the bypass for generating a more uniform fluid flow.

\* \* \* \* \*